(12) United States Patent
Takahashi et al.

(10) Patent No.: US 9,706,202 B2
(45) Date of Patent: *Jul. 11, 2017

(54) IMAGE ENCODING APPARATUS, IMAGE ENCODING METHOD, IMAGE DECODING APPARATUS, AND IMAGE DECODING METHOD

(71) Applicant: HITACHI MAXELL, LTD., Osaka (JP)

(72) Inventors: Masashi Takahashi, Yokohama (JP); Tomokazu Murakami, Kokubunji (JP)

(73) Assignee: Hitachi Maxell, Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/245,433

(22) Filed: Aug. 24, 2016

(65) Prior Publication Data

US 2016/0366406 A1 Dec. 15, 2016

Related U.S. Application Data

(63) Continuation of application No. 14/519,332, filed on Oct. 21, 2014, now Pat. No. 9,451,255, which is a (Continued)

(30) Foreign Application Priority Data

Oct. 10, 2007 (JP) ................................. 2007-263888

(51) Int. Cl.
*H04N 19/11* (2014.01)
*H04N 19/593* (2014.01)
(Continued)

(52) U.S. Cl.
CPC ........... *H04N 19/11* (2014.11); *H04N 19/124* (2014.11); *H04N 19/147* (2014.11);
(Continued)

(58) Field of Classification Search
CPC .... H04N 19/105; H04N 19/11; H04N 19/154; H04N 19/176; H04N 19/196;
(Continued)

(56) References Cited

U.S. PATENT DOCUMENTS

| 6,028,637 A | 2/2000 | Sugiyama |
| 6,275,533 B1 | 8/2001 | Nishi |

(Continued)

FOREIGN PATENT DOCUMENTS

| EP | 1 909 508 | 4/2008 |
| JP | 04-219074 | 8/1992 |

(Continued)

OTHER PUBLICATIONS

Japanese Office Action received in corresponding Japanese Application No. 2014-192491 dated Jul. 14, 2015.

(Continued)

*Primary Examiner* — Hung Dang
*Assistant Examiner* — Sunghyoun Park
(74) *Attorney, Agent, or Firm* — Mattingly & Malur, PC

(57) ABSTRACT

The present invention provides an image encoding/decoding technique that is capable of achieving the higher compression efficiency. An image encoding method comprises: an intra prediction step which performs intra prediction on a block basis to generate a predicted image; a subtraction step which calculates the difference in prediction between the predicted image generated by the intra prediction step and an original image; a frequency conversion step which performs frequency conversion processing for the difference in prediction; a quantization step which subjects the output of the frequency conversion step to quantization processing; and a variable-length encoding step which subjects the output of the quantization step to variable-length encoding processing; wherein the intra prediction encoding step predicts a (Continued)

target pixel to be encoded by use of pixel values of two reference pixels between which the target pixel to be encoded is located.

1 Claim, 15 Drawing Sheets

Related U.S. Application Data continuation of application No. 12/248,945, filed on Oct. 10, 2008, now Pat. No. 8,867,626.

(51) Int. Cl.
| H04N 19/176 | (2014.01) |
| H04N 19/147 | (2014.01) |
| H04N 19/124 | (2014.01) |
| H04N 19/159 | (2014.01) |
| H04N 19/17 | (2014.01) |
| H04N 19/182 | (2014.01) |
| H04N 19/567 | (2014.01) |

(52) U.S. Cl.
CPC ........... *H04N 19/159* (2014.11); *H04N 19/17* (2014.11); *H04N 19/176* (2014.11); *H04N 19/182* (2014.11); *H04N 19/567* (2014.11); *H04N 19/593* (2014.11)

(58) Field of Classification Search
CPC .. H04N 19/197; H04N 19/198; H04N 19/593; H04N 19/60; H04N 19/63; H04N 19/182; H04N 19/44; H04N 19/61; H04N 19/159; H04N 19/103
See application file for complete search history.

(56) References Cited

U.S. PATENT DOCUMENTS

| 7,289,672 | B2* | 10/2007 | Sun | H04N 19/197 375/240.14 |
| 7,386,048 | B2* | 6/2008 | Sun | H04N 19/197 375/240.15 |
| 7,426,308 | B2 | 9/2008 | Hsu et al. | |
| 2001/0012398 | A1 | 8/2001 | Todoroki | |
| 2001/0017942 | A1 | 8/2001 | Kalevo et al. | |
| 2002/0181790 | A1* | 12/2002 | Nakata | H04N 19/105 382/236 |
| 2004/0057520 | A1 | 3/2004 | Sun | |
| 2004/0184666 | A1 | 9/2004 | Sekiguchi et al. | |
| 2004/0234143 | A1* | 11/2004 | Hagai | H04N 19/105 382/238 |
| 2005/0243920 | A1 | 11/2005 | Murakami et al. | |
| 2006/0072676 | A1 | 4/2006 | Gomila | |
| 2007/0002945 | A1* | 1/2007 | Kim | H04N 19/176 375/240 |
| 2007/0009039 | A1 | 1/2007 | Ryu | |
| 2007/0110153 | A1 | 5/2007 | Cho et al. | |
| 2007/0160305 | A1 | 7/2007 | Demos | |
| 2007/0217703 | A1 | 9/2007 | Kajiwara | |
| 2008/0069465 | A1 | 3/2008 | Higashi | |
| 2008/0232471 | A1* | 9/2008 | Mittal | H04N 19/176 375/240.13 |
| 2009/0122864 | A1 | 5/2009 | Palfner et al. | |
| 2009/0257665 | A1 | 10/2009 | Kato et al. | |

FOREIGN PATENT DOCUMENTS

| JP | 04219074 | 10/1992 |
| JP | 10-136376 | 5/1998 |
| JP | 10136376 | 5/1998 |
| JP | 2006-352181 | 12/2006 |
| JP | 2015223004 | 12/2015 |
| WO | 2005107267 | 11/2005 |
| WO | 2007/010690 | 1/2007 |
| WO | 2008012918 | 1/2008 |

OTHER PUBLICATIONS

Extended European Search Report received in corresponding European Application No. 16150161.4 dated Apr. 8, 2016.
Benierbah et al., Compression of colour images by inter-band compensated prediction, IEE Proceedings online No. 20050129, pp. 237-243.
Morvan et al., Incorporating Depth-Image Based View-Prediction Into H.264 for Multiview-Image Coding,Image Processing, 2007. ICIP 2007. IEEE International Conference on pp. 205-208.
G. Sullivan and T. Wiegand, "Rate-Distortion Optimizatin for Video Compression", IEEE Signal Processing Magazine, Nov. 1998.
T. Shiodera, A. Tanizawa, T. Chujoh, "Block Based Extra/Interpolating Prediction for Intra Coding" PCSJ2006, Nov. 2006.
Wiegand T. et al, "Overview of the H.264/AVC video coding standard", IEEE Transactions on Circuits and Systems for Video Technology, IEEE Service Center, Piscataway, NJ, US, vol. 13, No. 7, Jul. 1, 2003 pp. 560-576.
Marta Karczewicz et al, "Interpolation Solution with Low Encoder Memory Requirements and Low Decoder Complexity" ITU Study Group 16—Video Coding Experts Group—ISO/IEC MPEG & ITU-T VCEG (ISO/IEC JTC1/SC291/WG11 and ITU-T SGIC16 Q6), No. VCEG-N31r1, Oct. 1, 2001.
Peng Zhang et al, "Multiple Modes Intra-Prediction in Intra Coding", 2004 IEEE International Conference on Multimedia and Expo (ICME) (IEEE Cat. No. 04TH8763) IEEE Piscataway, NJ, USA, vol. 1, Jun. 27, 2004, pp. 419-422, XP010770800, Section 2.3, Fig. 3.
Takahashi M et al.: "TSIP: Improved intra prediction method", 33.sup.rd VCEG Meeting: Shenzhen, China, Oct. 20, 2007.
Shiodera T et al.: "Bidirectional intra prediction", 31.sup.st VCEG Meeting: Marrakech, MA, Jan. 15-16, 2007.
Japanese Office Action dated Jul. 23, 2013 for Application No. 2012-025715.
Japanese Office Action (Notification of Reasons for Refusal) received in corresponding Japanese Application No. 2015-179599 dated Oct. 8, 2015.
Taichiro Shiodera. et al. and Bidirectional. Intra. Prediction, ITU—Telecommunications Standardization Sector Study Group 16 Question 6 VideoCodingExperts Group, 31st Meeting: Marrakech, MA, Jan. 2007, and VCEG-AE14 and pp. 1-6.

* cited by examiner

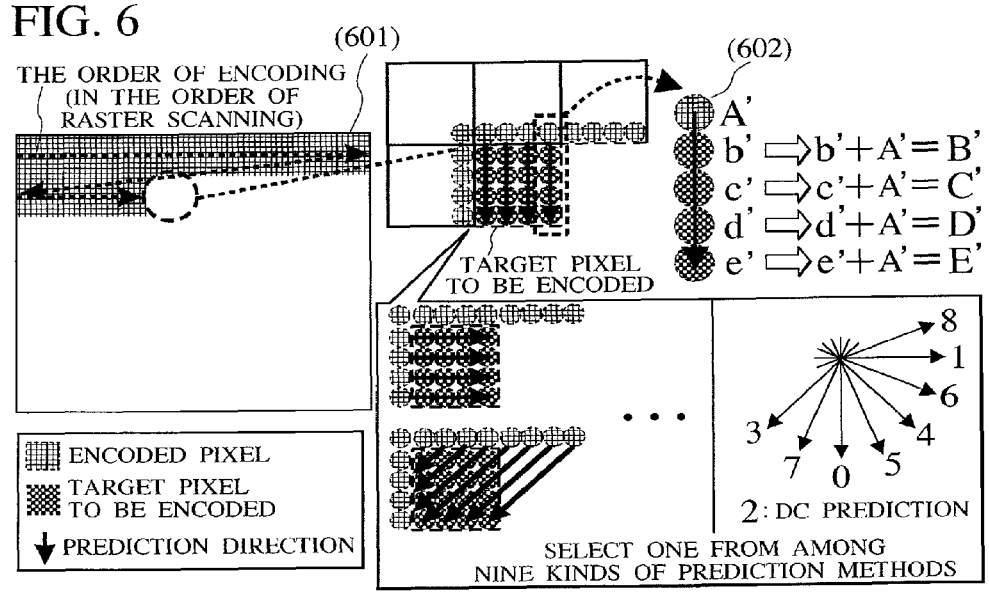
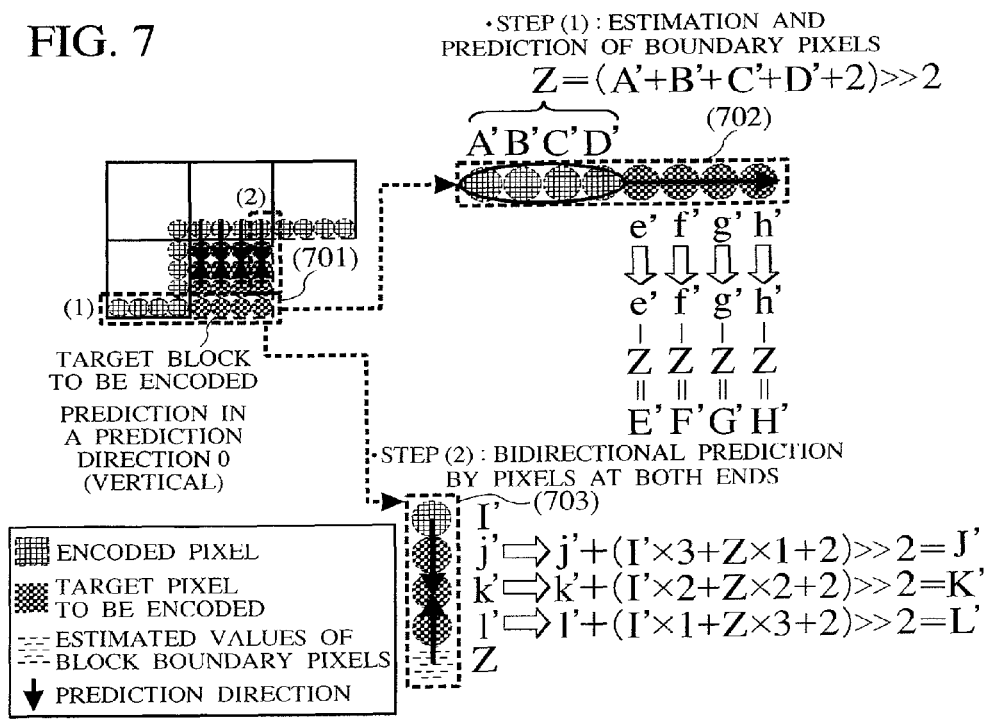

FIG. 10
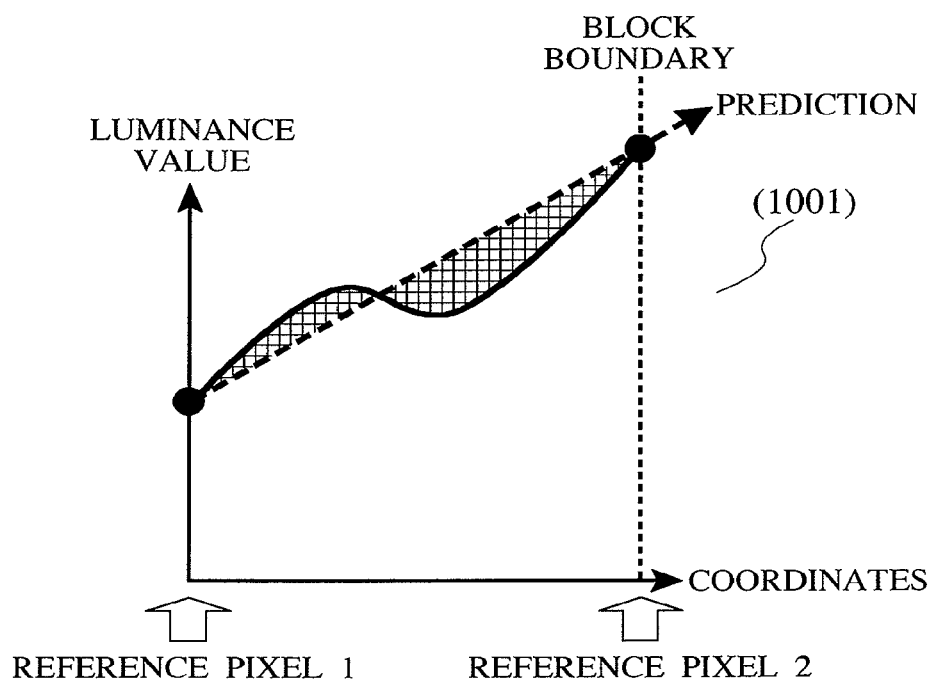
PREDICTION ACCORDING TO THE PRESENT INVENTION
(WHEN LUMINANCE GRADIENT IS STEEP)
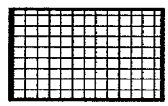

FIG. 11

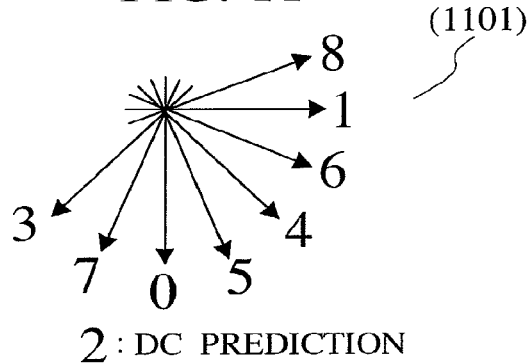

2 : DC PREDICTION

NINE KINDS OF PREDICTION METHODS

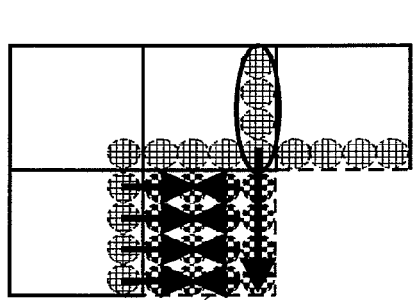

TARGET BLOCK

PREDICTION IN
A PREDICTION DIRECTION 1

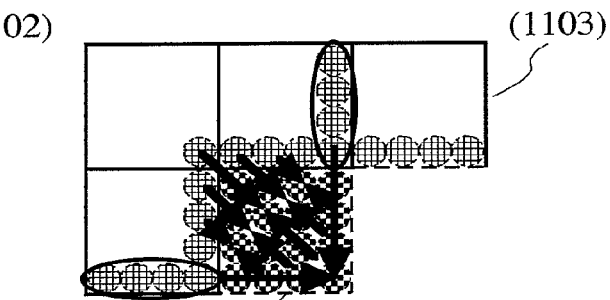

TARGET BLOCK

PREDICTION IN
A PREDICTION DIRECTION 4

EXAMPLE OF PREDICTION OF BLOCKS OTHER THAN
BLOCKS LOCATED AT THE END OF A SCREEN

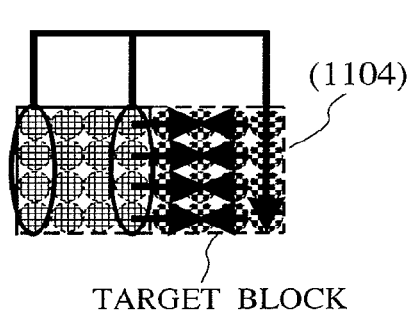

TARGET BLOCK

PREDICTION IN
A PREDICTION DIRECTION 1

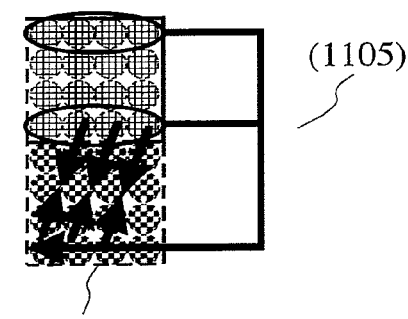

TARGET BLOCK

PREDICTION IN
A PREDICTION DIRECTION 7

EXAMPLE OF PREDICTION OF BLOCKS
LOCATED AT THE END OF THE SCREEN

NINE KINDS OF PREDICTION METHODS

FIG. 17
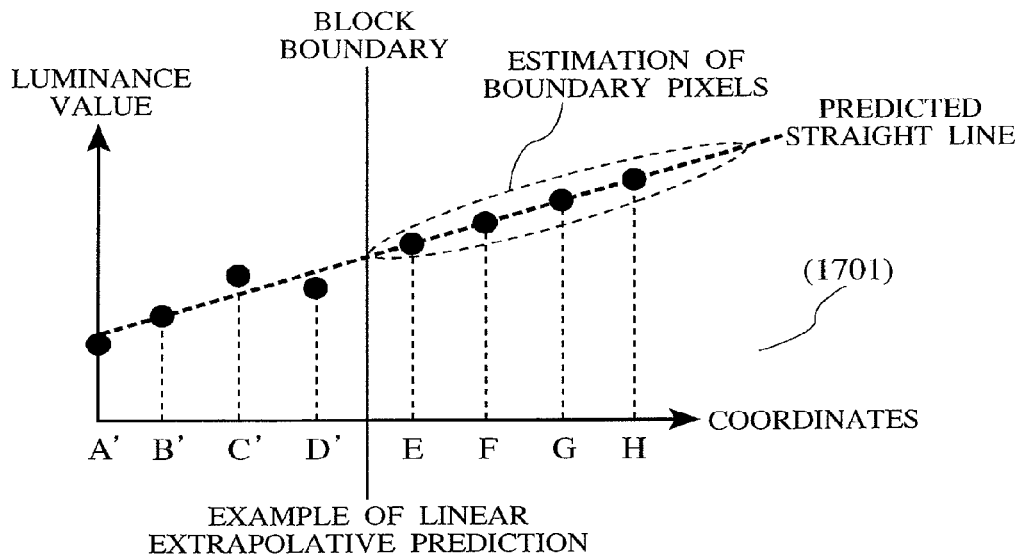
EXAMPLE OF LINEAR EXTRAPOLATIVE PREDICTION
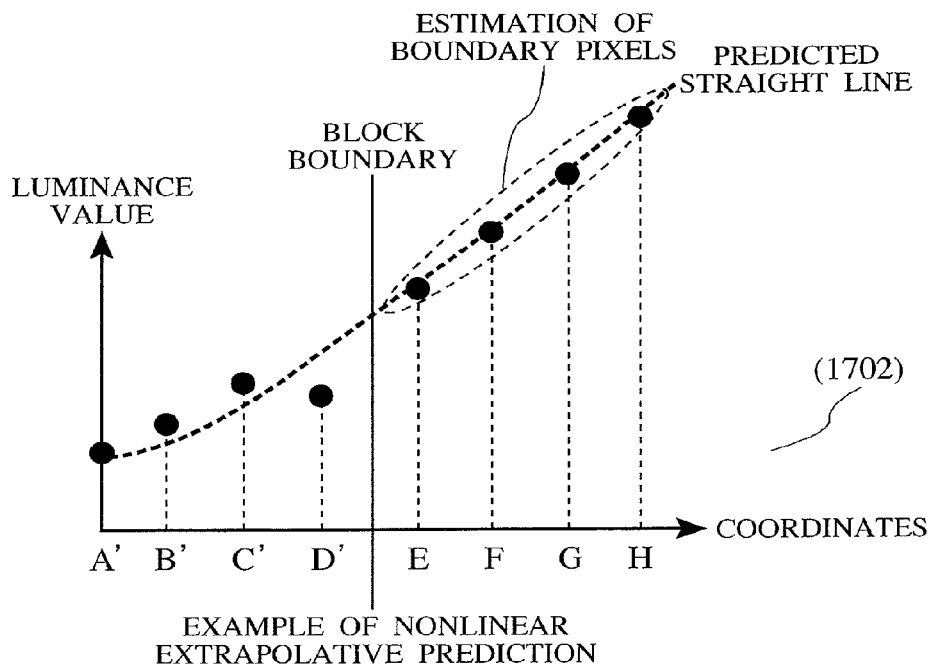
EXAMPLE OF NONLINEAR EXTRAPOLATIVE PREDICTION

IMAGE ENCODING APPARATUS, IMAGE ENCODING METHOD, IMAGE DECODING APPARATUS, AND IMAGE DECODING METHOD

CLAIM OF PRIORITY

The present application is a continuation application of Ser. No. 14/519,332, filed Oct. 21, 2014, which is a continuation application of Ser. No. 12/248,945, filed Oct. 10, 2008, now U.S. Pat. No. 8,867,626, which claims priority from Japanese patent application serial no. JP 2007-263888, filed on Oct. 10, 2007, the content of which is hereby incorporated by reference into this application.

BACKGROUND OF THE INVENTION (1) Field of the Invention

The present invention relates to moving image encoding techniques for encoding a moving image.

(2) Description of the Related Art

Encoding methods including MPEG (Moving Picture Experts Group) method have been drafted as techniques for converting a large amount of moving image information into digital data to write and transfer the digital data. Such encoding methods include MPEG-1 standards, MPEG-2 standards, MPEG-4 standards, and H.264/AVC (Advanced Video Coding) standards and are used as international standard encoding methods.

According to the above-described standards, information about an image whose encoding processing has been completed is used to predict, on a block basis, a target image to be encoded. Then, by encoding the difference in prediction between the target image and an original image, the redundancy of the moving image is eliminated to reduce the encoding amount. In particular, according to the H.264/AVC standards, a drastic improvement in compression ratio is achieved by adopting the intra prediction encoding method that uses pixels surrounding a target block to be encoded.

However, when the intra prediction according to the H.264/AVC standards is executed, a prediction method thereof is too simple to achieve the sufficient prediction accuracy. For example, the intra prediction based on the H.264/AVC standards adopts a unidirectional prediction method in which only one reference pixel is specified so that all pixels in a prediction direction are predicted by use of a pixel value of only one reference pixel as a reference value. Accordingly, there was room for an improvement in prediction accuracy. Therefore, an intra encoding technique, which is capable of improving the accuracy of intra prediction to increase a compression ratio, is required.

As a technique for improving the accuracy in intra prediction, for example, JP-A-2006-352181 discloses that kinds of pixels which can be used for intra prediction are increased by enabling inverting of the whole image before encoding it.

In addition, nonpatent literature 1 discloses a technique in which prediction is performed by use of blocks existing on the upper and lower and right and left sides by changing the order of encoding on a block basis.

Nonpatent literature 1: "Block Based Extra/Interpolating Prediction for Intra Coding" T. Shiodera, A. Tanizawa, T. Chujoh, PCSJ2006, November, 2006.

SUMMARY OF THE INVENTION

However, according to JP-A-2006-352181, unidirectional prediction is simply performed by using a pixel value of only one reference pixel as a reference value like in the H.264/AVC standards after the image is inverted. Therefore, it is not possible to further improve the prediction accuracy.

In addition, according to the nonpatent literature 1, the number of blocks, each of which can be predicted by use of blocks existing on the upper and lower and right and left sides, is limited. Therefore, the prediction accuracy of blocks other than these predictable blocks decreases in comparison with that in the case of the H.264/AVC standards.

The problem with the above conventional techniques is that, for example, when a luminance value largely changes in a prediction direction, the difference in predicted value becomes larger, which causes the encoding amount to increase, resulting in a reduction in compression ratio.

The present invention has been made taking the above-described problem into consideration, and an object of the present invention is to provide an image encoding/decoding technique that is capable of achieving the higher compression efficiency.

BRIEF DESCRIPTION OF THE INVENTION

These and other features, objects and advantages of the present invention will become apparent from the following description when taken in conjunction with the accompanying drawings wherein:

FIG. 6 is a diagram illustrating intra prediction decoding processing used in the H.264/AVC standards;

FIG. 7 is a diagram illustrating intra prediction decoding processing according to one embodiment of the present invention;

FIG. 10 is a diagram illustrating intra prediction according to one embodiment of the present invention;

FIG. 11 is a diagram illustrating intra prediction according to one embodiment of the present invention;

FIG. 17 is a diagram illustrating a prediction method that differs from the intra prediction according to one embodiment of the present invention;

DETAILED DESCRIPTION OF THE PREFERRED EMBODIMENT

Figure 1:
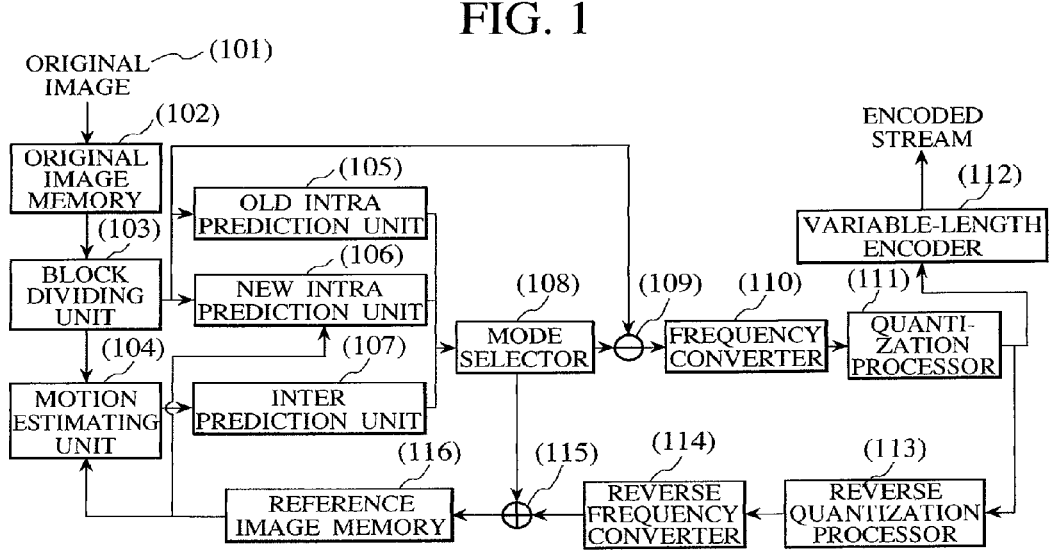
FIG. 1 is a diagram illustrating an image encoding apparatus according to one embodiment of the present invention.

Embodiments of the present invention will be described below with reference to the accompanying drawings.

Each element designated by the same reference numeral in the drawings has substantially the same function.

"the sum of pixels" in the description and drawings of this specification expresses a result obtained by adding pixel values.

First of all, the operation of intra prediction encoding processing based on the H.264/AVC standards will be described with reference to FIG. 3. In the case of the H.264/AVC standards, a target image to be encoded is encoded in the order of raster scanning (301). Incidentally, in general, the order of raster scanning means that processing is performed from the top left end of a screen to the right end, and then the processing is performed from the bottom left end of the screen to the right end, and this series of processing is repeated.

Here, each pixel of a target block to be encoded is predicted by using a pixel value of a decoded image in each of encoded blocks that are adjacent to the target block to be encoded on the left, upper left, upper, and upper right sides of the target block.

Figure 3:
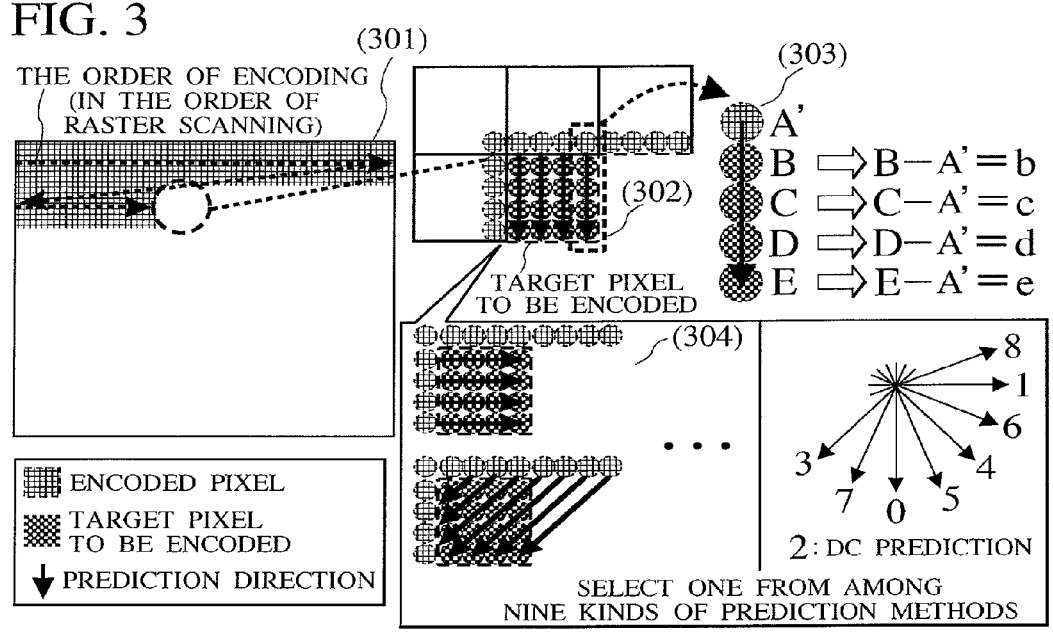
FIG. 3 is a diagram illustrating intra prediction encoding processing used in the H.264/AVC standards.

In particular, a pixel value of one pixel selected from among 13 pixels in the encoded blocks shown in FIG. 3 is used as a reference value. All pixels which are in alignment with the same straight line in a prediction direction from the one pixel (a start point) are predicted by referring to the pixel value of the one pixel as the reference value (302).

For example, as shown with reference numeral 303, all of pixels B, C, D, E of the target block to be encoded are subjected to prediction encoding with reference to the same pixel. Next, difference values (difference in prediction) b, c, d, e from a value A', which has been obtained by decoding a pixel directly above the pixel B, are calculated. Moreover, in the case of the H.264/AVC standards, the most suitable prediction direction candidate can be selected from among eight kinds of prediction direction candidates (for example, vertical, horizontal, and diagonal) on a block basis, so that value of the difference in prediction, and a value of the prediction direction are encoded. It should be noted that, according to the H.264/AVC standards, it is possible to use "DC prediction" that predicts all pixels included in a target block to be encoded on the basis of an average value of reference pixels (304) in addition to the prediction in the specific direction.

Next, the operation of intra prediction decoding processing based on the H.264/AVC standards will be described with reference to FIG. 6. Similar to the encoding processing, decoding processing is also executed in the order of raster scanning (601). A pixel value of a decoded image is calculated by use of a decoded reference pixel and the difference in prediction. To be more specific, a decoded image is acquired by adding the difference in prediction to the reference pixel in a prediction direction.

For example, in reference numeral 602, by adding difference in prediction values b', c', d', e' of a target block to be decoded (values obtained by decoding b, c, d, e shown in FIG. 3 respectively, the values including a quantization error) to the decoded reference pixel A' respectively, decoded pixels B', C', D', E' (decoded pixels for B, C, D, E shown in FIG. 3) are acquired respectively.

As described above, the intra prediction encoding processing based on the H.264/AVC adopts a simple unidirectional method in which only one reference pixel is specified to predict all pixels in a prediction direction by a value of the reference pixel.

Figure 9:
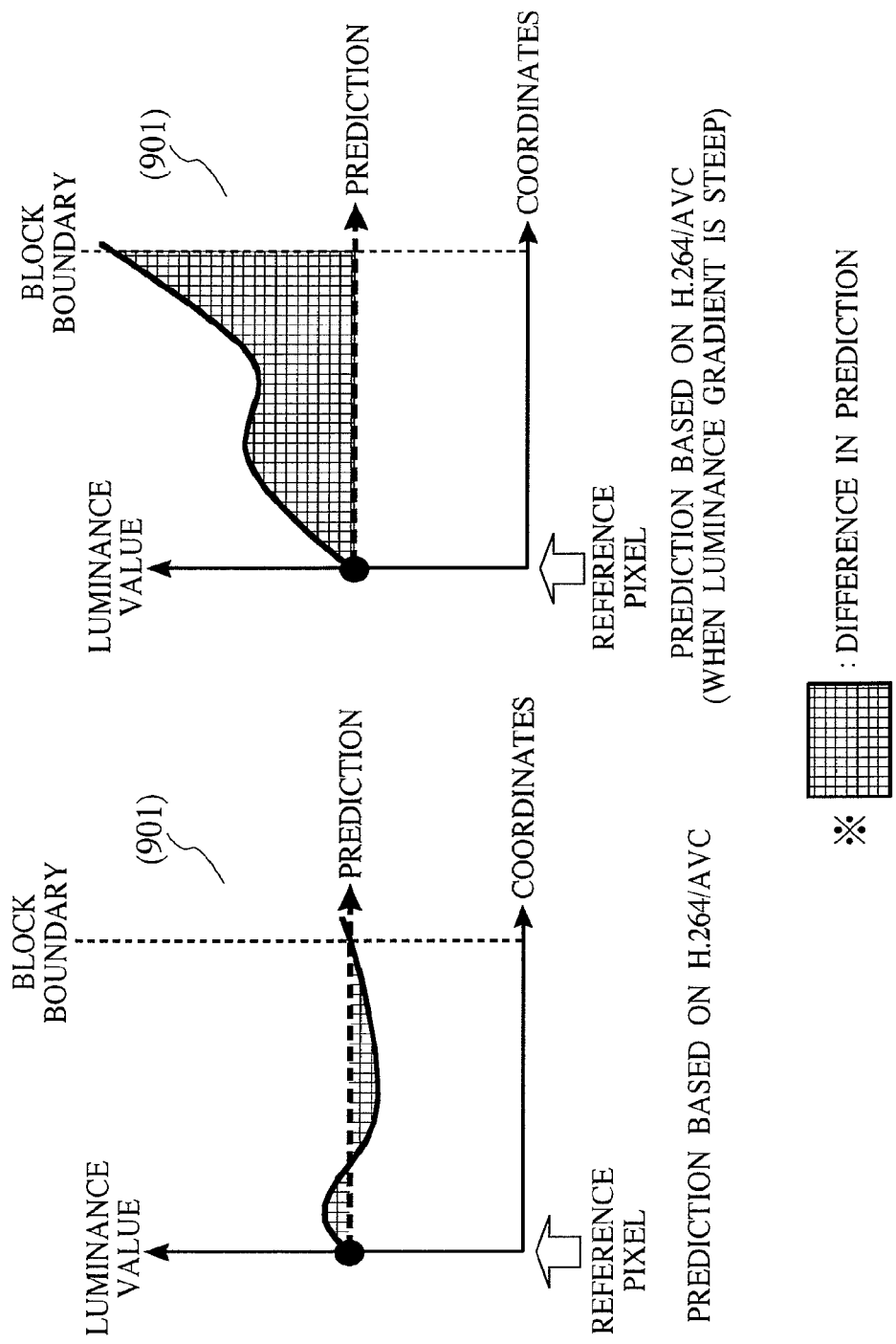
FIG. 9 is a diagram illustrating intra prediction used in the H.264/AVC standards.

FIG. 9 is a conceptual diagram illustrating intra prediction encoding based on the H.264/AVC standards. Here, a horizontal axis indicates coordinate values in a target block in a prediction direction; and a vertical axis indicates a pixel value (luminance value) in the coordinates. Accordingly, a curve in a graph expresses a luminance curve in a target block. As previously described, according to the H.264/AVC standards, blocks which can be referred to when intra prediction is performed are limited to blocks located on the left and upper sides of a target block. The H.264/AVC standards, therefore, adopt a method in which a reference pixel is copied in one direction. In this case, as indicated with reference numeral 901, if a luminance gradient in the target block is gentle, there is a higher possibility that prediction will come true. Accordingly, the difference in prediction decreases. However, as indicated with reference numeral 902, if the luminance gradient is steep, the difference in prediction increases with the increase in distance from the reference pixel, which results in an increase in the encoding amount.

FIG. 10 is a conceptual diagram illustrating intra prediction encoding according to this embodiment. In order to solve the above problem accompanied by the H.264/AVC standards, in this embodiment, as indicated with reference numeral 1001, a pixel located at a boundary of a target block is used as a new reference pixel (reference pixel 2) such that that prediction is performed in combination with a usual reference pixel (reference pixel 1). Specifically, two reference pixels (the reference pixel 1 and the reference pixel 2), both of which are located on a straight line passing through the target block, are selected. A value of a pixel located between these reference pixels is then predicted by interpolation processing based on interpolative prediction that uses the two reference pixels. This makes it possible to increase the prediction accuracy particularly for a block whose luminance gradient is steep and to reduce the number of prediction errors.

However, similar to the H.264/AVC standards, if encoding is performed in the order of raster scanning, in many cases a value of only one (reference pixel 1) of two reference pixels located at a boundary of a target block can be acquired. For this reason, the method according to the present application predicts a value of the other reference pixel (reference pixel 2) from a pixel value included in a surrounding encoded block.

To be more specific, according to this embodiment, if the reference pixel 1 and the reference pixel 2 can be selected from among encoded pixels, they are selected from among the encoded pixels. Here, if the reference pixel 2 cannot be selected from among the encoded pixels, the reference pixel 2 is predicted from the encoded pixels in advance. After that, as shown in FIG. 10, the prediction is performed by the interpolation processing based on the interpolative prediction that uses the two reference pixels.

As a result, even if one of the two reference pixels is not an encoded pixel, the prediction accuracy for a block whose luminance gradient is steep can be increased, and accordingly, the number of prediction errors can be reduced.

Figure 4:
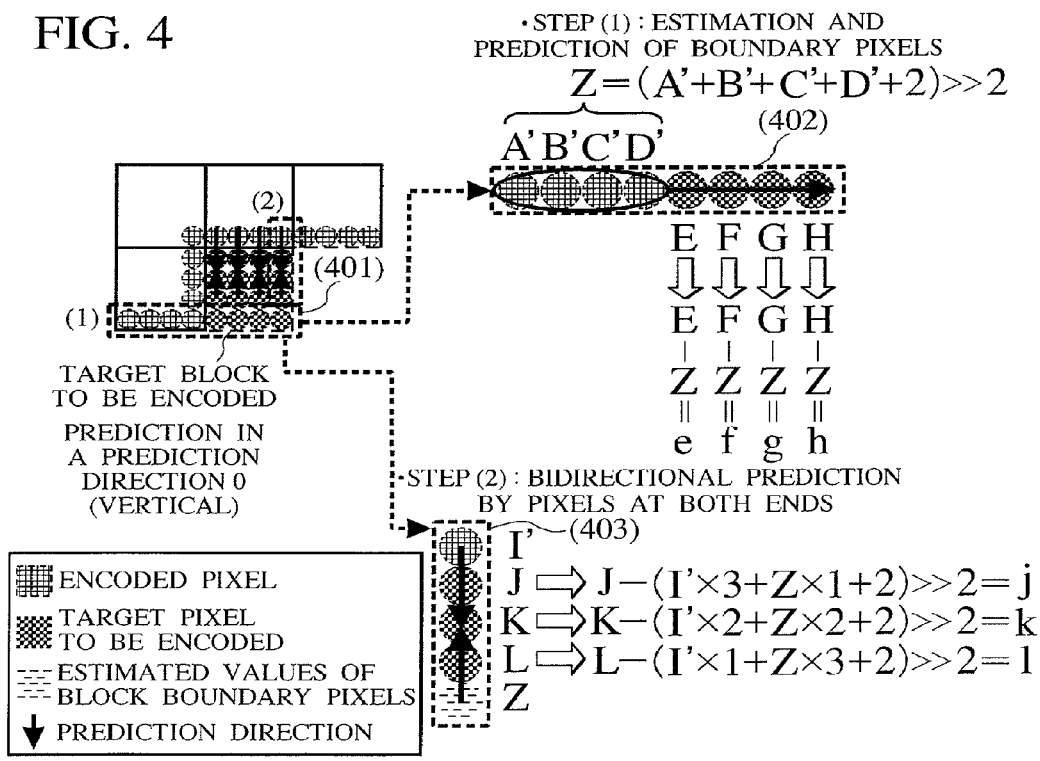
FIG. 4 is a diagram illustrating intra prediction encoding processing according to one embodiment of the present invention.

FIG. 4 is a diagram conceptually illustrating an operation example of intra prediction encoding processing according to this embodiment. Also in this case, a target image to be encoded is encoded in the order of raster scanning, and the prediction is performed by referring to encoded blocks that are adjacent to a target block on the left, upper left, upper, and upper right sides of the target block. Reference numeral 401 denotes intra prediction encoding steps in a vertical direction. Here, prediction is executed by two steps as follows: a step 1--prediction of a pixel located at a boundary of a target block (for example, a reference pixel 2 in (1001)) and the calculation of the difference in prediction; and a step 2--bidirectional prediction using reference pixels located at both ends of a target block.

In the step 1, two reference pixels used for the bidirectional prediction are selected. Here, if a reference pixel cannot be selected from among encoded pixels, the reference pixel is predicted based on surrounding encoded blocks. For example, with reference to reference numeral 402, values E, F, G, H of pixels located in the lowermost row of a target block are predicted by an average value Z of four decoded pixels A', B', C', D' located in the same row of a block that is adjacent to the target block on the left side of the target block. Concurrently, difference values of the difference between Z and the four pixels are encoded as difference in prediction values e, f, g, h respectively.

Next, in the step 2, other pixel values included in the target block are predicted by performing interpolation processing based on the interpolative prediction that uses the two reference pixels selected or predicted in the step 1. For example, with reference to reference numeral 403, pixels J, K, L each belonging to the same column in the target block are predicted by linear interpolation that uses a reference pixel I' and a value of Z predicted in the step 1, and thereby difference in prediction values j, k, l are calculated. Moreover, these difference in prediction values are encoded.

FIG. 7 is a diagram conceptually illustrating an operation example of intra prediction decoding processing according to this embodiment. Decoding can be made by executing steps reverse to those shown in FIG. 4 (701). First of all, an adjacent block located on the left side of the target block is used to calculate the reference pixel Z (702), and the reference pixel Z is then added to the difference in prediction values e', f', g', h' of pixels located at the boundary of the target block so as to acquire decoded images E', F', G', H' respectively. Subsequently, each pixel included in the target block is predicted (703) by the reference pixel I' included in an adjacent block located on the upper side of the target block, and by the linear interpolation based on the interpolative prediction of the value Z predicted by the above processing. Each predicted pixel is then added to difference in prediction values j', k', l' to acquire decoded pixels J', K', L' respectively.

Figure 5:
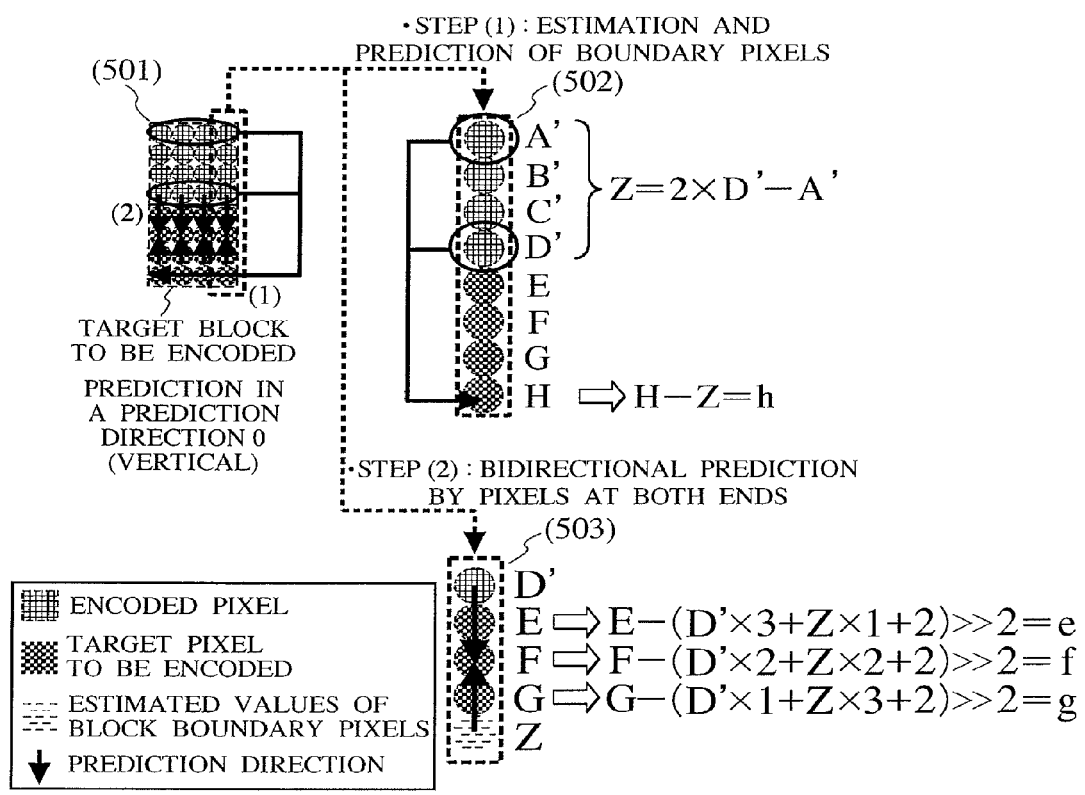
FIG. 5 is a diagram illustrating intra prediction encoding processing according to one embodiment of the present invention.

In the case of the intra prediction shown in FIG. 4, the method according to the present application cannot be applied to blocks located at the end of a screen because the adjacent blocks located on the left and upper sides of the target pixel are used to predict one of the reference pixels. Accordingly, the bidirectional prediction according to this embodiment can be applied to the blocks located at the end of the screen by performing intra prediction encoding, for example, according to steps shown in FIG. 5 (501). To be more specific, in the step 1 (the prediction of pixels located at the boundary of the target block, and the calculation of the difference in prediction), the extrapolative prediction is performed by use of decoded values A', D' of two pixels located at both ends of an adjacent block located on the upper side of the target block to predict a pixel H located at a boundary of the same column included in the target block. Then the difference h between a pixel value H and a predicted value Z is encoded as the difference in prediction (502).

Next, in the step 2 (the bidirectional prediction using reference pixels located at both ends of the target block), pixels E, F, G each belonging to the same column in the target block are predicted by performing linear interpolation based on the interpolative prediction that uses Z predicted in the step 1 as well as the reference pixel D', and then difference in prediction values e, f, g are encoded (503). That is, the step 1 of the intra prediction processing used for blocks located at the end of the screen differs in comparison with the other cases (shown in FIG. 4).

Figure 8:
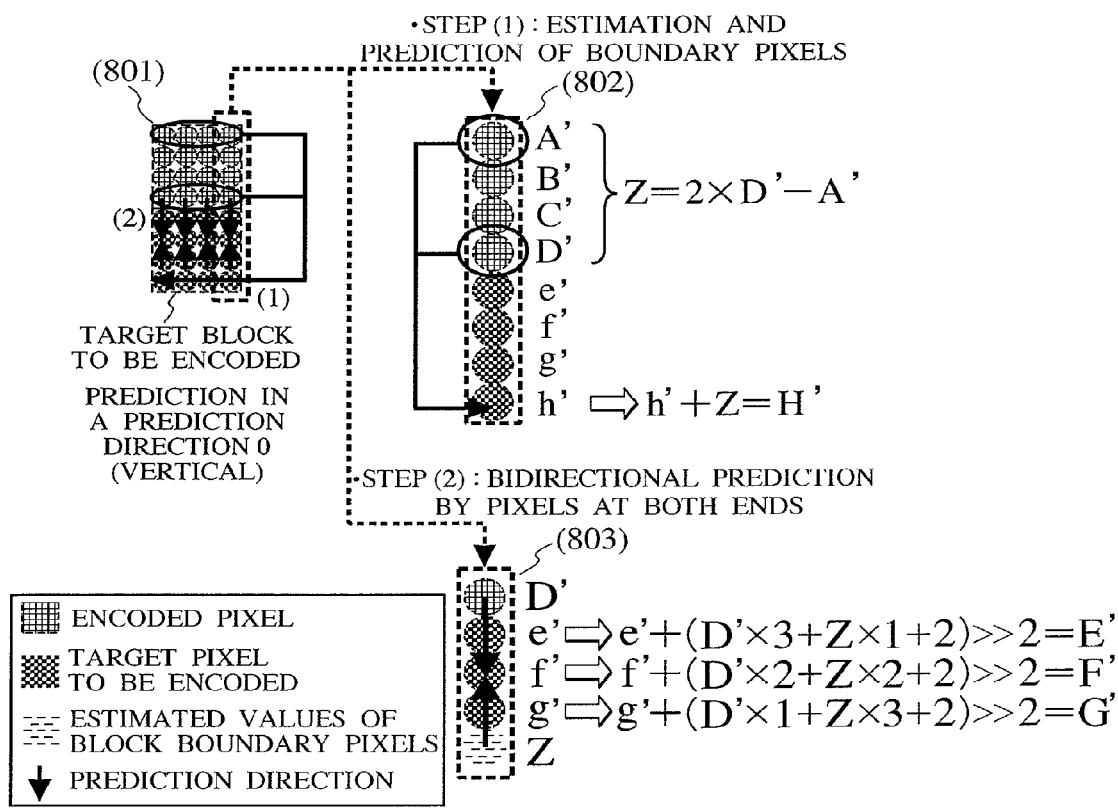
FIG. 8 is a diagram illustrating intra prediction decoding processing according to one embodiment of the present invention.

Even if an adjacent block located on the left side of the target block cannot be used, the bidirectional prediction according to this embodiment can be achieved by using the above step for the blocks located at the end of the screen. In this case, decoding can be performed by use of steps shown in FIG. 8. To be more specific, decoding can be made by executing steps reverse to those shown in FIG. 5 (801). First, an adjacent block located on the upper side of the target block is used to calculate the reference pixel Z (802), and the reference pixel Z is then added to a difference in prediction value h' of a pixel located at the boundary of the target block so as to acquire a decoded image H. Subsequently, each pixel included in the target block is predicted (903) by the reference pixel D' included in an adjacent block located on the upper side of the target block, and by the linear interpolation using the value Z predicted by the above processing. Each predicted pixel is then added to difference in prediction values e', f', g' to acquire decoded pixels E', F', G' respectively.

Even in the case of the method according to the present application, a prediction method can be selected from among a plurality of candidates. For example, one of eight kinds of prediction directions other than DC prediction can be selected from among nine prediction methods (1101) used in the H.264/AVC standards shown in FIG. 11. For example, when prediction is performed in a horizontal direction (prediction direction 1) (1102), for blocks other than blocks located at the end of a screen, a pixel belonging to the rightmost column of a target block is predicted by use of an adjacent block located on the upper side of the target block. The predicted pixel is then used as one of reference pixels to perform the bidirectional prediction.

In addition, when prediction is performed in a diagonal direction as indicated with a prediction direction 4 (1103), a pixel belonging to the rightmost column of the target block, and a pixel belonging to the lowermost line of the target block, are predicted from adjacent blocks located on the upper and left sides of the target block respectively so as to achieve the bidirectional prediction. On the other hand, for the blocks located at the end of the screen, for example, when prediction is performed in the horizontal direction (prediction direction 1) (1104), an adjacent block located on the left side of the target block is used to predict a pixel value belonging to the leftmost column of the target block so as to achieve the bidirectional prediction. Moreover, in the case of a prediction direction 7 (1105), an adjacent block located on the upper side of the target block is used to predict a pixel value belonging to the lowermost column of the target block so as to achieve the bidirectional prediction. In this case, even if adjacent blocks located on the upper and left sides cannot be used, the use of the steps of (1104) and (1105) makes it possible to achieve the bidirectional prediction according to this embodiment.

If the prediction encoding technique according to this embodiment is used in combination with the conventional technologies, a high compression ratio can be achieved in response to characteristics of an image. For example, encoding which is suitable for characteristics of the image can be made by appropriately using, on a block basis, the technique according to the present invention and the conventional techniques in performing encoding prediction. The conventional techniques which are effective include, for example, the intra prediction encoding method (decoding method) based on the H.264/AVC standards shown in FIG. 3 (FIG. 6), and the inter prediction method that is also used in the H.264/AVC standards (prediction method referring to an image that differs from a target image to be encoded).

FIG. 1 is a diagram illustrating one embodiment of a moving image encoding apparatus according to the present invention. The moving image encoding apparatus includes: an input image memory 102 for storing an inputted original image 101; a block dividing unit 103 for dividing an input image into small areas; and a motion estimating unit 104 for detecting motion on a block basis. The moving image encoding apparatus further includes: an old intra prediction unit 105 for performing intra prediction processing on a block basis according to steps other than those of this embodiment (for example, according to the intra prediction based on the H.264/AVC standards (shown in FIG. 3)); a new intra prediction unit 106 for performing intra prediction according to this embodiment on a block basis (shown in FIGS. 4, 5); and an inter prediction unit 107 for performing inter prediction on a block basis on the basis of the amount of motion estimated by the motion estimating unit 10. The moving image encoding apparatus further includes: a mode selector 108 for determining prediction encoding means (a prediction method and the block size) that suit characteristics of an image; a subtraction unit 109 for calculating difference in prediction; a frequency converter 110 and a quantization unit 111 that encode the difference in prediction; a variable-length encoding unit 112 for performing encoding according to the probability of occurrence of a symbol; a reverse quantization processor 113 and a reverse frequency converter 114 that decode the difference in prediction which has been encoded; an adder 115 for generating a decoded image by use of the decoded difference in prediction; and a reference image memory 116 for storing a decoded image so that the decoded image is used for the prediction thereafter.

The input image memory 102 stores, as a target image to be encoded, one image selected from among original images 101. The target image is divided into small blocks by the block dividing unit 103. The small blocks are then sent to the motion estimating unit 104, the old intra prediction unit 105, and the new intra prediction unit 106. The motion estimating unit 104 calculates the amount of motion of a particular block by use of a decoded image stored in the reference image memory 116, and then sends the calculated amount of motion to the inter prediction unit 107 as a motion vector. The old intra prediction unit 105, the new intra prediction unit 106, and the inter prediction unit 107 executes intra prediction processing and inter prediction processing on a block basis using several kinds of block size. The mode selector 108 selects the most suitable prediction encoding means. Next, the subtraction unit 109 generates the difference in prediction from the output by the most suitable prediction encoding means, and then sends the difference in prediction to the frequency converter 110. The frequency converter 110 and the quantization processor 111 perform, on a block basis using the specified block size, the frequency conversion and quantization processing (for example, DCT (Discrete Cosine Transformation)) for the difference in prediction that has been sent. The result of the frequency conversion and quantization processing is sent to the variable-length encoding unit 112 and the reverse quantization processor 113. Moreover, in the variable-length encoding unit 112, not only information about the difference in prediction, which is expressed by a frequency conversion coefficient, but also information required for prediction encoding (including, for example, a prediction direction in intra prediction encoding, and a motion vector in inter prediction encoding), is subjected to variable-length encoding on the basis of the probability of occurrence of a symbol so that an encoded stream is generated.

In addition, in the reverse quantization processor 113 and the reverse frequency converter 114, a frequency conversion coefficient subjected to quantization undergoes reverse frequency conversion such as reverse quantization and IDCT (Inverse DCT) such that the difference in prediction is acquired. The difference in prediction is then transmitted to the adder 115. Next, the adder 115 generates a decoded image, which is then stored in the reference image memory 116.

Figure 2:
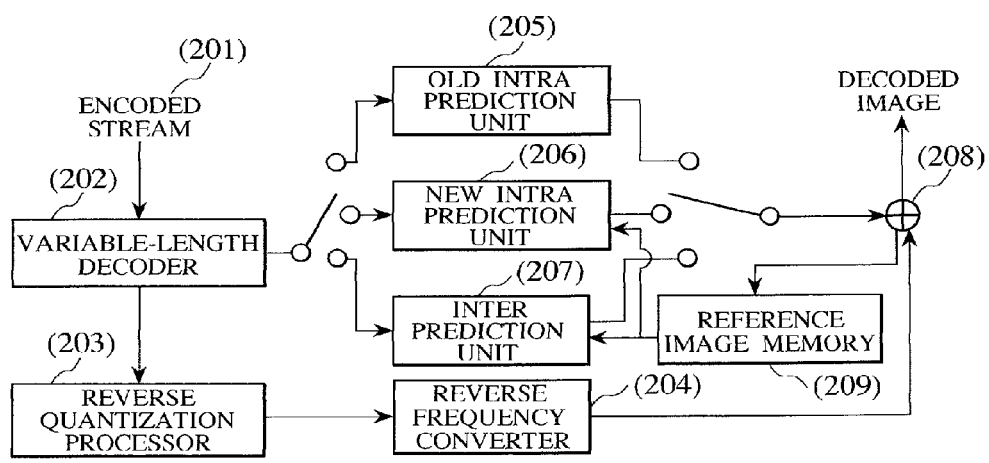
FIG. 2 is a diagram illustrating an image decoding apparatus according to one embodiment of the present invention.

FIG. 2 is a diagram illustrating one embodiment of a moving image decoding apparatus according to the present invention. The moving image decoding apparatus includes: a variable-length decoder 202 for, according to steps reverse to those of the variable-length encoding, performing decoding of an encoded stream 201 generated by, for example, the moving image encoding apparatus shown in FIG. 1; and a reverse quantization processor 203 and a reverse frequency converter 204 that decode the difference in prediction. The moving image decoding apparatus further includes: an old intra prediction unit 205 for performing intra prediction processing according to steps other than those of this embodiment (for example, according to the intra prediction based on the H.264/AVC standards (shown in FIG. 6)); a new intra prediction unit 206 for performing intra prediction according to this embodiment (shown in FIGS. 7, 8); an inter prediction unit 207 for performing intra prediction; an adder 208 for acquiring a decoded image; and a reference image memory 209 for temporarily storing the decoded image.

The variable-length decoder 202 decodes a encoded stream 201 in variable-length to acquire a frequency conversion coefficient component of the difference in prediction, and information required for prediction processing including a prediction direction or a motion vector. The former, which is the information about the difference in prediction, is transmitted to the reverse quantization processor 203. The latter, which is the information required for the prediction processing, is transmitted to the old intra prediction unit 205, the new intra prediction unit 206, or the inter prediction unit 207 in response to prediction means. Next, in the reverse quantization processor 203 and the reverse frequency converter 204, the information about the difference in prediction is subjected to reverse quantization and reverse frequency conversion respectively such that the information about the difference in prediction is decoded. On the other hand, in the old intra prediction unit 205, the new intra prediction unit 206, or the inter prediction unit 206, the prediction processing is executed with reference to the reference image memory 209 on the basis of information transmitted from the variable-length decoder 202 to allow the adder 208 to generate a decoded image, which is then stored in the reference image memory 209.

Figure 12:
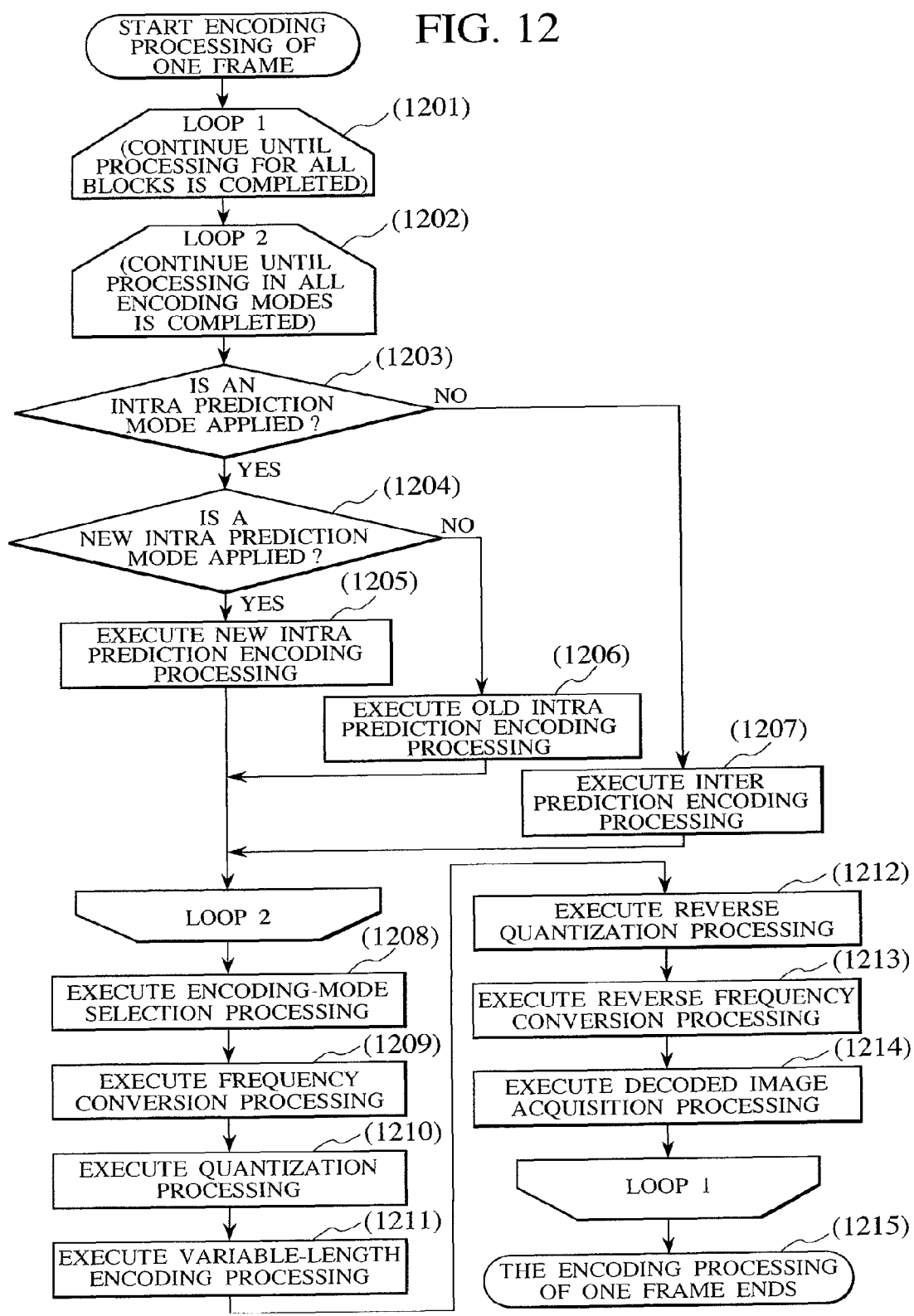
FIG. 12 is a flowchart illustrating an image encoding apparatus according to one embodiment of the present invention.

FIG. 12 is a flowchart illustrating how to encode one frame by the encode processing of the moving image encoding apparatus shown in FIG. 1 according to the embodiment of the present invention. First, all blocks existing in a target frame to be encoded (step 1201) are subjected to the following processing. To be more specific, each block is subjected to prediction encoding processing in each of all encoding modes (that is to say, a combination of a prediction method and the block size) beforehand to calculate the difference in prediction. After that, a block whose encoding efficiency is the highest is selected from among the calculated values of the difference in prediction. A prediction processing method will be described as below. In addition to the method described in this embodiment (hereinafter referred to as "new intra prediction encoding processing" (step 1205)), for example, the intra prediction method adopted in the H.264/AVC standards (hereinafter referred to as "old intra prediction encode processing" (step 1206)), and inter prediction encoding processing (step 1207) are executed. By selecting the most suitable mode from among them, efficient encoding can be performed in response to characteristics of an image. When an encoding mode whose encoding efficiency is high is selected from among the large number of encoding modes described above (step 1208), the use of the RD-Optimization method enables efficient encoding. The RD-Optimization method is used to determine the most suitable encoding mode on the basis of, for example, the relationship between the distortion in image quality and the encoding amount. If the RD-Optimization method is used, for example, the method is applicable that is disclosed in G, Sullivan and T. Wiegand: "Rate-Distortion Optimization for Video Compression", IEEE Signal Processing Magazine, vol, 15, no. 6, pp, 74-90, 1998.

Next, the difference in prediction generated in the selected encoding mode is subjected to the frequency conversion (209) and the quantization processing (1210), and is then subjected to variable-length encoding so as to generate an encoded stream (step 1211). In contrast, a frequency conversion coefficient subjected to quantization undergoes reverse quantization processing (step 1212) and reverse frequency conversion processing (step 1213) to decode the difference in prediction such that a decoded image is generated. The decoded image is then stored in the reference image memory (step 1214). If all blocks have been subjected to the above processing, encoding of one image frame ends (step 1215).

Figure 13:
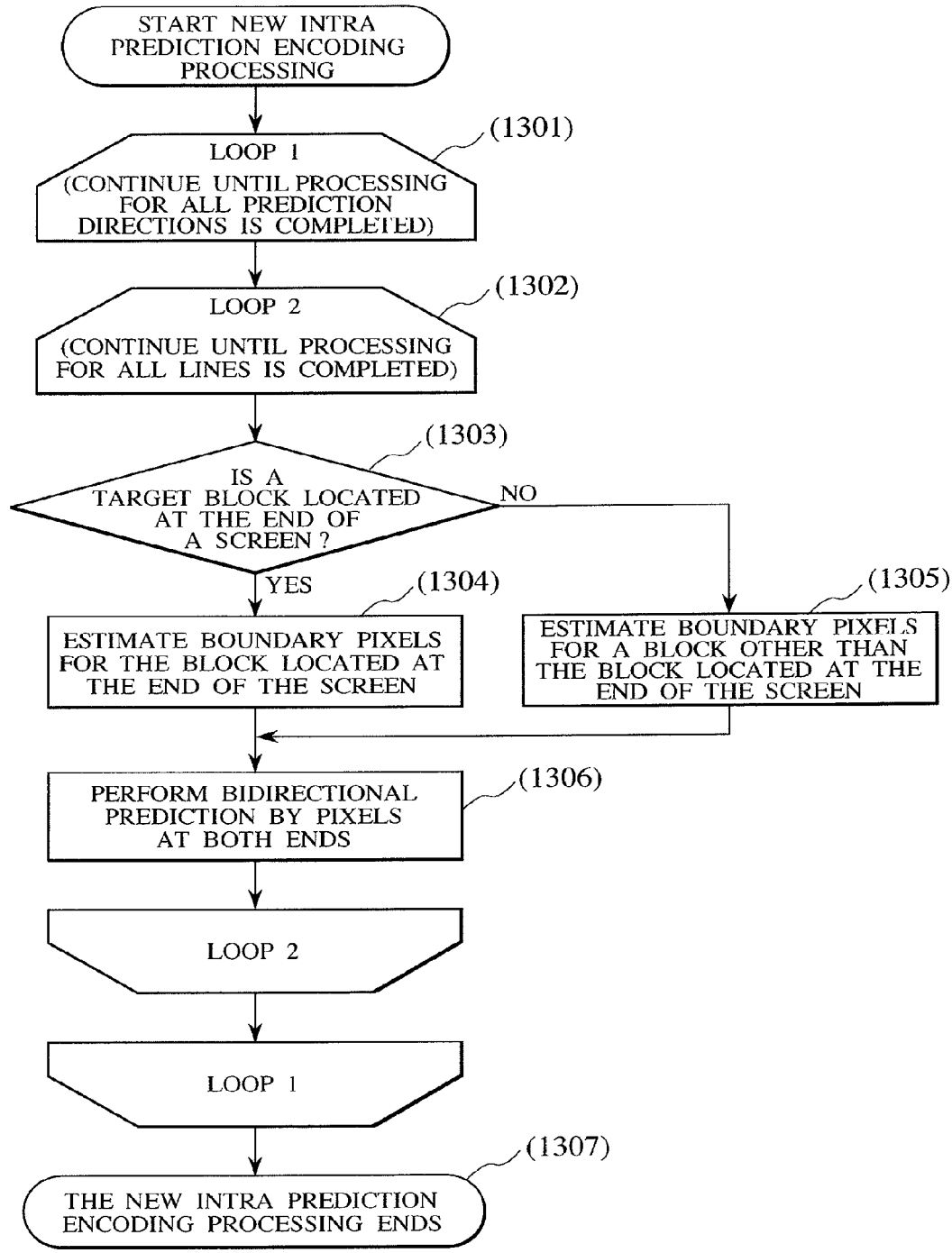
FIG. 13 is a flowchart illustrating in detail an image encoding apparatus according to one embodiment of the present invention.

FIG. 13 is a flowchart illustrating in detail the new intra prediction encoding processing (the step 1205). Here, for example, as shown with the reference numeral 1101, the following processing is performed for all prediction directions defined beforehand (step 1301), and is performed for all lines in each prediction direction (step 1302). To be more specific, if a target block is located at the end of a screen (step 1303), a boundary pixel is predicted, and the difference in prediction is calculated, according to the step 1 shown in FIG. 5 (step 1304). In contrast, if the target block is not located at the end of the screen, a boundary pixel is predicted, and the difference in prediction is calculated, according to the step 1 shown in FIG. 4 (step 1305). Subsequently, based on values of reference pixels included in surrounding blocks and values of the boundary pixels predicted by the above steps, bidirectional prediction is performed according to the step 2 shown in FIGS. 4 and 5 (step 1305). If the above processing for all prediction directions and all lines is completed, the prediction encoding processing for one block ends (step 1307).

Figure 14:
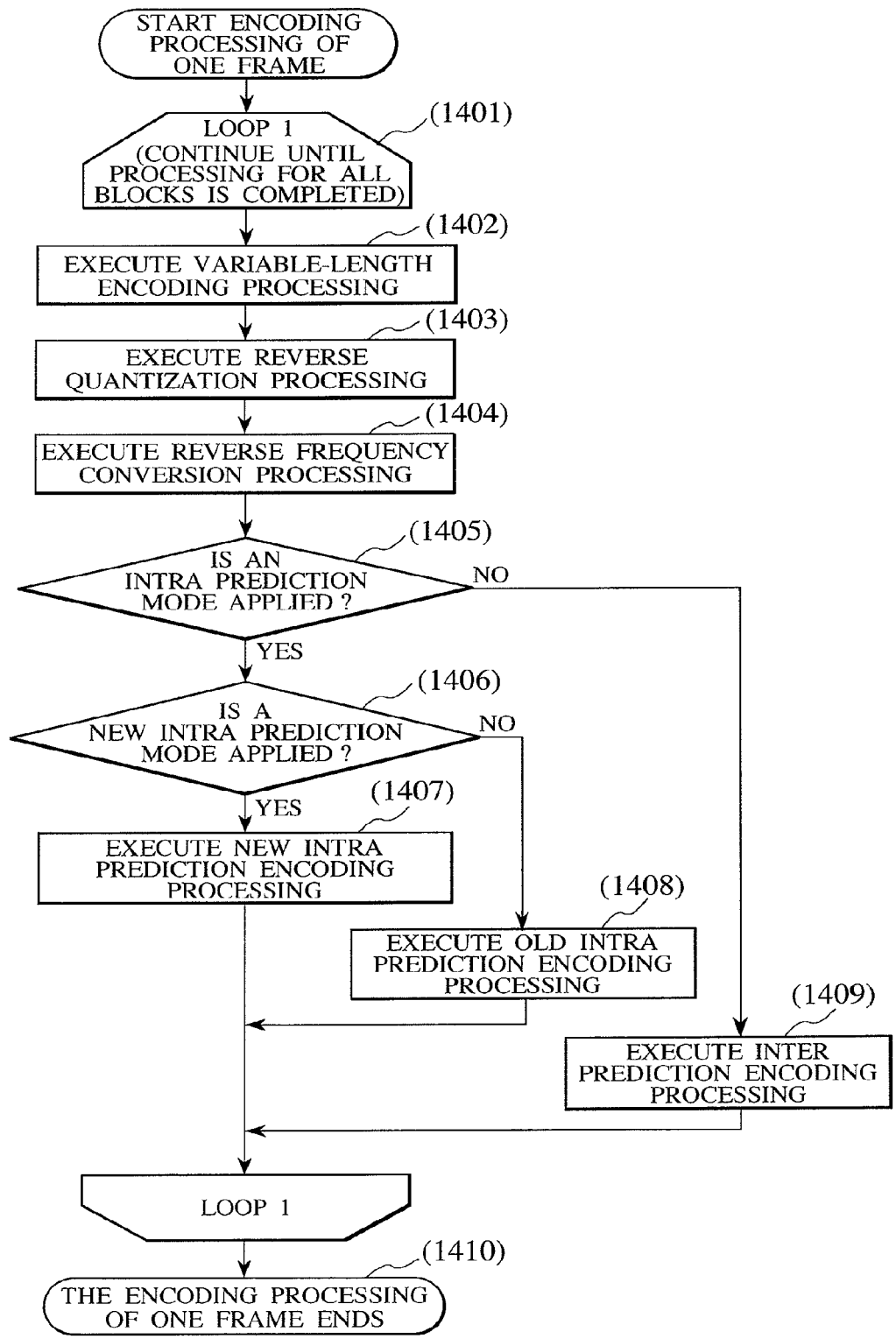
FIG. 14 is a flowchart illustrating an image decoding apparatus according to one embodiment of the present invention.

FIG. 14 is a flowchart illustrating how to decode one frame by the decode processing of the moving image decoding apparatus shown in FIG. 2 according to the embodiment of the present invention. First, all blocks included in one frame are subjected to the following processing (step 1401). To be more specific, an input stream is subjected to variable-length decoding processing (step 1402), reverse quantization processing (step 1403), and reverse frequency conversion processing (step 1404) such that the difference in prediction is decoded. Subsequently, according to the method having subjected the target block to prediction encoding, new intra prediction decoding processing (step 1407), old intra prediction decoding processing (step 1408), or inter prediction decoding processing (step 1409) is executed to acquire a decoded image. The acquired decoded image is then stored in the reference image memory. If all blocks included in the one frame have been completely subjected to the above processing, decoding for the one image frame ends (step 1410).

Figure 15:
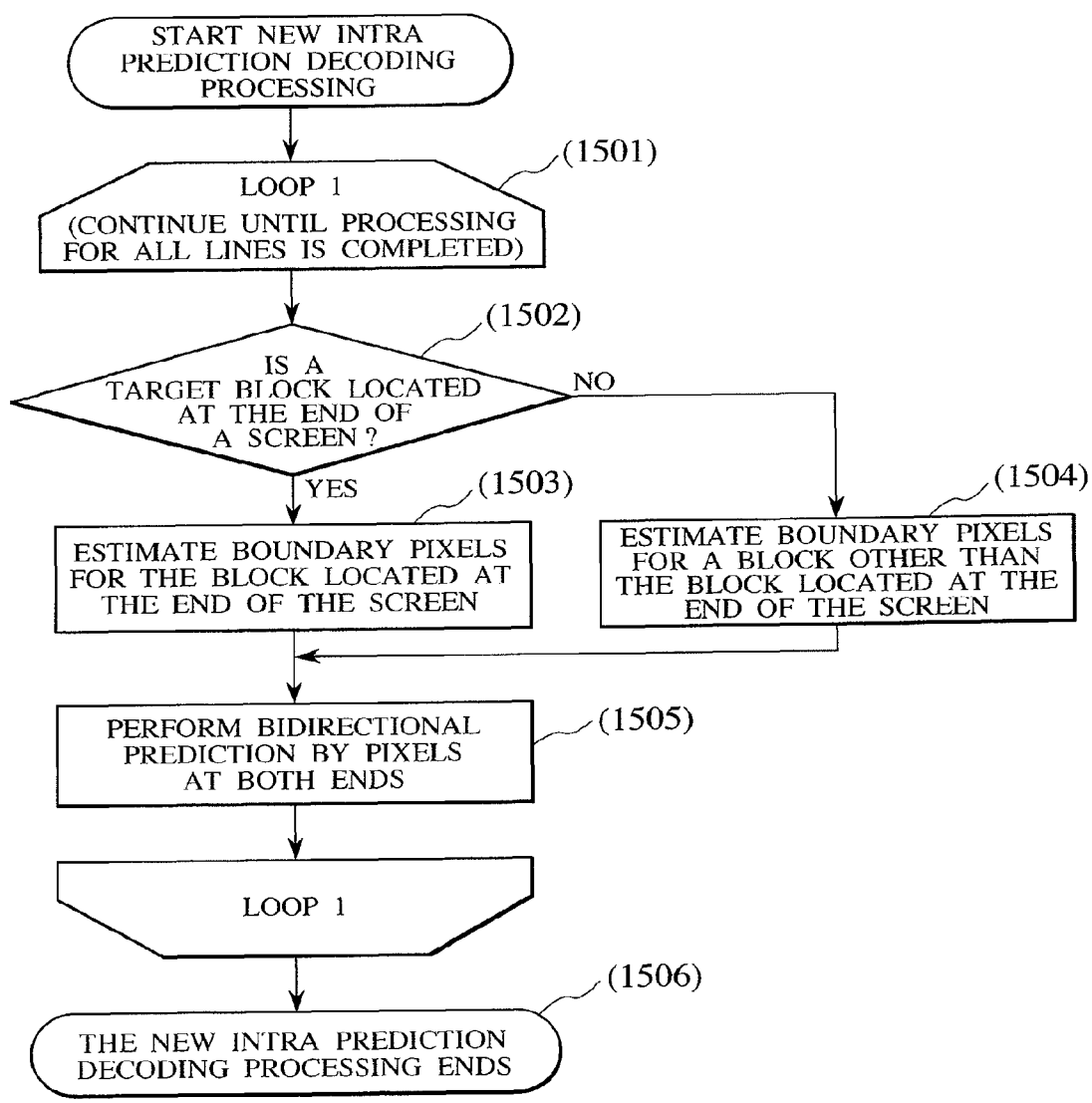
FIG. 15 is a flowchart illustrating in detail an image decoding apparatus according to one embodiment of the present invention.

FIG. 15 is a flowchart illustrating in detail the new intra prediction decoding processing (the step 1407). Here, all lines in a prediction direction are subjected to the following processing (step 1501). To be more specific, if a target block is located at the end of a screen (step 1402), a boundary pixel is predicted, and the difference in prediction is calculated, according to the step 1 shown in FIG. 8 (step 1403). In contrast, if the target block is not located at the end of the screen, a boundary pixel is predicted, and the difference in prediction is calculated, according to the step 1 shown in FIG. 7 (step 1404). Subsequently, based on values of reference pixels included in surrounding blocks and values of the boundary pixels predicted by the above steps, bidirectional prediction is performed according to the step 2 shown in FIGS. 7 and 8 (step 1405). If all lines have been completely subjected to the above processing, the prediction encoding processing for one block ends (step 1406).

In this embodiment, DCT is taken as an example of the frequency conversion. However, any orthogonal transformation used for elimination of correlation between pixels may also be adopted (for example, DST (Discrete Sine Transformation), WT (Wavelet Transformation), DFT (Discrete Fourier Transformation), or KLT (Karhunen-Loeve Transformation)). In particular, the difference in prediction itself may also be encoded without performing the frequency conversion. Moreover, the execution of variable-length encoding is not particularly required. In addition, this embodiment describes the case where luminance components are predicted particularly on a block (4.times.4 pixel size) basis. However, this embodiment may also be applied to any size block (for example, 8.times.8 pixel size, and 16.times.16 pixel size). Further, this embodiment may also be applied not only to the prediction of luminance components, but also to the prediction of color difference components Furthermore, according to this embodiment, the prediction is performed in eight directions that are specified in the H.264/AVC standards. However, the number of directions may also be increased or decreased.

Figure 16:
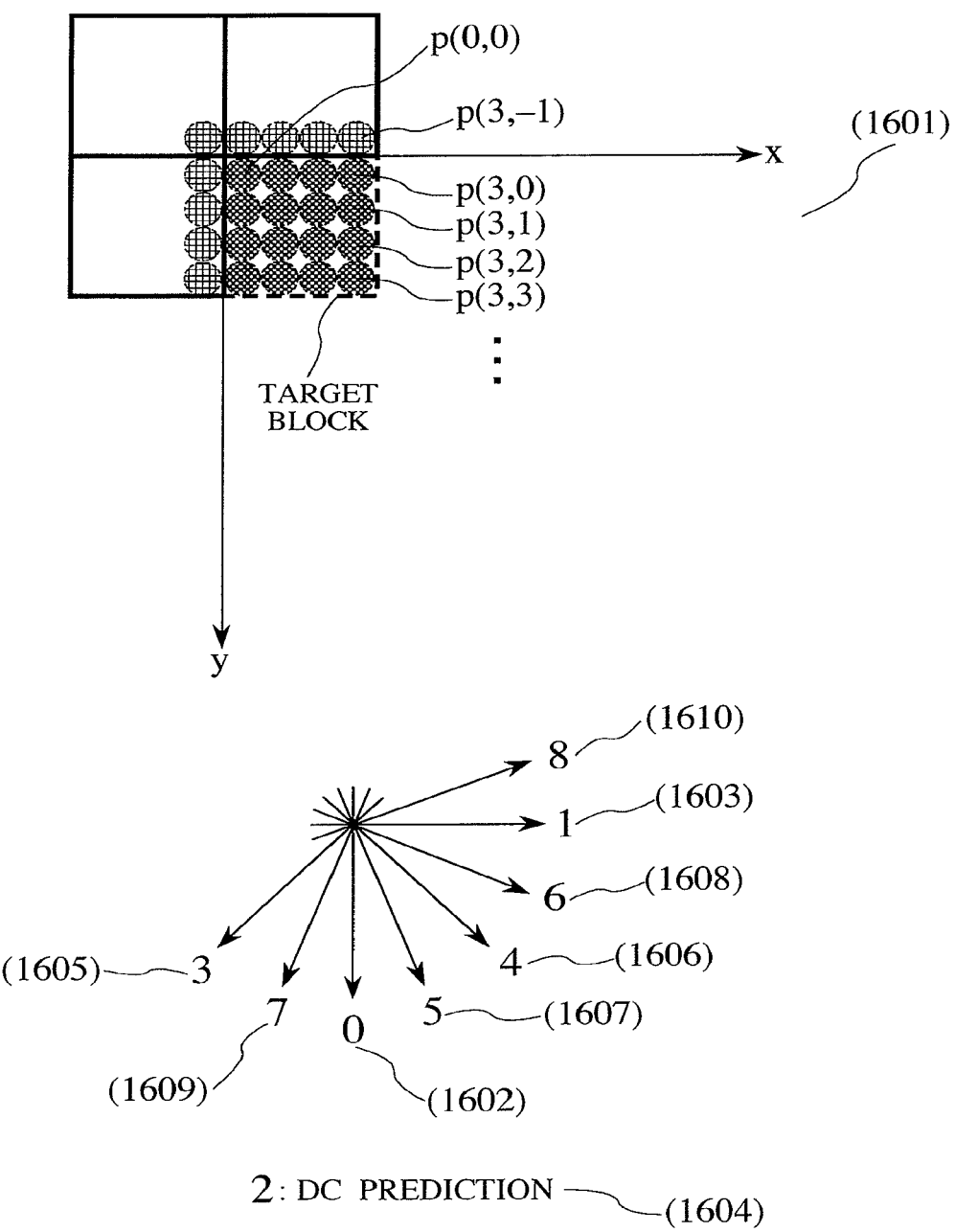
FIG. 16 is a diagram illustrating one embodiment of the present invention.

Next, an example of a prediction equation in this embodiment will be described. Here, a case where luminance components are predicted on a 4.times.4-pixel-size block basis will be described. First, as shown in FIG. 16 (1601), on the assumption that coordinates of a pixel located at the upper leftmost of a target block are (0, 0), x axis is set on the right side in the horizontal direction, whereas y axis is set on the lower side in the vertical direction. Next, a luminance value at coordinates (x, y) in a target block is expressed as P [x, y]; and a predicted value is expressed as pred4.times.4 [x, y]. In addition, two reference pixels used for the bidirectional prediction are expressed as Ref1, Ref2 respectively. Incidentally, a function Min (a, b) returns a smaller one of two integers a, b; and a function ROUND (a) returns an integer value obtained by rounding off the first decimal place of a real number a.

Next, a case where prediction is performed in eight kinds of directions excluding DC prediction (1604) from among nine kinds of prediction methods (1602) through (1610) will be described using an equation of a predicted value pred4.times.4.

When prediction is to be executed in a prediction direction 0 (Vertical) (1602), the prediction is performed by an equation 1 as follows:

a case where adjacent blocks located on the left and the upper side can be used:

$$Ref1=p[x, -1]$$

$$Ref2=(p[-1,3]+p[-2,3]+p[-3,3]+p[-4,3]+2)>>2$$

$$pred4.times.4[x,y]=ROUND(Ref1+(Ref2Ref1)(y+1)/4) \quad \text{(Equation 1)}$$

a case where although an adjacent block located on the upper side can be used, an adjacent block located on the left side cannot be used:

$$Ref2=p[x, -1]$$

$$Ref2=2p[x,--1]-p[x,-4]$$

$$pred4.times.4[x,y]=ROUND(Ref1+(Ref2Ref1)(y+1)/4)$$

When prediction is to be executed in a prediction direction 1 (Horizontal) (1603), the prediction is performed by an equation 2 as follows:

a case where adjacent blocks located on the left and the upper side can be used:

$$Ref2=p[-1, y]$$

$$Ref2=(p[3,-1]+p[3,-2]+p[3,-3]+p[3,-4]+2)>>2$$

$$pred4.times.4[x,y]=ROUND(Ref1+(Ref2Ref1)(x+1)/4) \quad \text{(Equation 2)}$$

a case where although an adjacent block located on the left side can be used, an adjacent block located on the upper side cannot be used:

$$Ref1=p[-1, y]$$

$$Ref2=2p[-1,y]-p[-4,y]$$

$$pred4.times.4[x,y]=ROUND(Ref1+(Ref2Ref1)(x+1)/4)$$

When prediction is to be executed in a prediction direction 3 (Diagonal Down Left) (1605), the prediction is performed by an equation 3 as follows:

a case where adjacent blocks located on the left and the upper side can be used:

when x=y=3

$$Ref1=(p[6,-1]+3p[7,-1]+2)>>2$$

$$Ref2=(p[-1,2]+3p[-1,3]+2)>>2$$

$$pred4.times.4[x,y]=ROUND(Ref1+Ref2)2) \quad \text{(Equation 3)}$$

for the other cases (more specifically, x is not equivalent to 3, and y is not equivalent to 3)

$$Ref1=(p[x+y,-1]+2p[x+y+1,-1]+p[x+y+2,-1]+2)>>2$$

$$Ref2=(p[-1,Min(3,x+y)]+2p[-1,Min(3,x+y+1)]+p[-1,Min(3,x+y+2)]+2)>>-2$$

$$pred4.times.4[x,y]=ROUND(Ref1+(Ref2Ref1)(y+1)/(x+y+2))$$

a case where although an adjacent block located on the upper side can be used, an adjacent block located on the left side cannot be used:

when x=y=3

$$Ref1=(p[6,-1]+3p[7,-1]+2)>>2$$

$$Ref2=(p[3,-1]+p[3,-2]+p[3,-3]+p[3,-4]+2)>>2$$

$$pred4.times.4[x,y]=ROUND(Ref1+Ref2)2)$$

for the other cases (more specifically, x is not equivalent to 3, and y is not equivalent to 3)

$$Ref1=(p[x+y,-1]+2p[x+y+1,-1]+p[x+y+2,-1]+2)>>2$$

$$Ref2=(p[3,-1]+p[3,-2]+p[3,-3]+p[3,-4]+2)>>2$$

$$pred4.times.4[x,y]=ROUND(Ref1+(Ref2Ref1)(y+1)/(x+y+2))$$

When prediction is to be executed in a prediction direction 4 (Diagonal Down Right) (1606), the prediction is performed by an equation 4 as follows:

a case where adjacent blocks located on the left and the upper side can be used:

when x>y $$Ref1=(p[x-y-2,-1]+2p[x-y-1,-1]+p[x-y,-1]+2)>>2$$

$$Ref2=(p[3,-1]+p[3,-2]+p[3,-3]+p[3,-4]+2)2$$

$$pred4.times.4[x,y]=ROUND(Ref1+(Ref2-Ref1)x/3) \quad \text{(Equation 4)}$$

when x<y $$Ref1=(p[-1,y-x-2]+2p[-1,y-x-1]+p[-1,y-x]+2)>>2$$

$$Ref2=(p[-1,3]+p[-2,3]+p[-3,3]+p[-4,3]+2)>>2$$

$$pred4.times.4[x,y]=ROUND(Ref1+(Ref2-Ref1)y/3)$$

when x=y $$Ref1=(p[0,-1]+2p[-1,-1]+p[-1,0]+2)>>2$$

$$Ref2=(p[3,-1]+p[3,-2]+p[-1,3]+p[-2,3]+2)>>2$$

$$pred4.times.4[x,y]=ROUND(Ref1+(Ref2-Ref1)(x+1)/4)$$

When prediction is to be executed in a prediction direction 5 (Vertical Right) (1607), the prediction is performed by an equation 5 as follows:

when zVR=2*xy, a case where adjacent blocks located on the left and the upper side can be used:

when zVR=0, 2, 4, 6

$$Ref1=(p[x-(y>>1)-1,-1]+p[x-(y>>1),-1]+1)>>1$$

$$Ref2=(p[-1,3]+p[-2,3]+p[-3,3]+p[-4,3]+2)>>2$$

$$pred4.times.4[x,y]=ROUND(Ref1+(Ref2-Ref1)(y+1)/4) \quad \text{(Equation 5)}$$

when zVR=1, 3, 5

$Ref1=(p[x-(y>>1)-2,-1]+2p[x-(y>>1)-1,-1]+p[x-(y>>1),-1]+2)>>2$ $Ref2=(p[-1,3]+p[-2,3]+p[-3,3]+p[-4,3]+2)>>2$ $pred4\times 4[x,y]=ROUND(Ref1+(Ref2-Ref1)(y+1)/4)$ when zVR=−1

$Ref1=(p[-1,0]+2p[-1,-1]+p[0,-1]+2)>>2$ $Ref2=(p[-1,3]+p[-2,3]+p[-3,3]+p[-4,3]+2)>>2$ $pred4\times 4[x,y]=ROUND(Ref1+(Ref2-Ref1)(y+1)/4)$ for the other cases (more specifically, zVR=−2, −3)

$Ref1=(p[-1,y-1]+2p[-1,y-2]+p[1,y-3]+2)>>2$ $Ref2=(p[-1,3]+p[-2,3]+p[-3,3]+p[-4,3]+2)>>2$ $pred4\times 4[x,y]=ROUND(Ref1+(Ref2-Ref1)(y+1)/4)$ When prediction is to be executed in a prediction direction 6 (Horizontal Down) (1608), the prediction is performed by an equation 6 as follows:
when zHD=2*yx,
a case where adjacent blocks located on the left and the upper side can be used:
when zHD=0, 2, 4, 6

$Ref1=(p[-1,y-(x>>1)-1]+p[-1,y-(x>>1)]+1)>>1$ $Ref2=(p[3,-1]+p[3,-2]+p[-1,3]+p[-2,3]+2)>>2$ $pred4\times 4[x,y]=ROUND(Ref1+(Ref2-Ref1)(x+1)/4)$ (Equation 6)

when zHD=1, 3, 5

$Ref1=(p[-1,y-(x>>1)-2]+2p[-1,y-(x>>1)-1]+p[-1,y-(x>>1)-]+2)>>2$ $Ref2=(p[3,-1]+p[3,-2]+p[-1,3]+p[-2,3]+2)>>2$ $pred4\times 4[x,y]=ROUND(Ref1+(Ref2-Ref1)(x+1)/4)$ when zHD=−1

$Ref1=(p[-1,0]+2p[-1,-1]+p[0,-1]+2)>>2$ $Ref2=(p[3,-1]+p[3,-2]+p[-1,3]+p[-2,3]+2)>>2$ $pred4\times 4[x,y]=ROUND(Ref1+(Ref2-Ref1)(x+1)/4)$ for the other cases (more specifically, zHD=−2, −3)

$Ref1=(p[x-1,-1]+2p[x-2,-1]+p[x-3,-1]+2)>>2$ $Ref2=(p[3,-1]+p[3,-2]+p[-1,3]+p[-2,3]+2)>>2$ $pred4\times 4[x,y]=ROUND(Ref1+(Ref2-Ref1)(x+1)/4)$ When prediction is to be executed in a prediction direction 7 (Vertical Left) (1609), the prediction is performed by an equation 7 as follows:
a case where adjacent blocks located on the left and the upper side can be used:
when y=0, 2

$Ref1=(p[x+(y>>1),-1]+p[x+(y>>1)+1,-1]+1)>>1$ $Ref2=(p[-1,3]+p[-2,3]+p[-3,3]+p[-4,3]+2)>>2$ $pred4\times 4[x,y]=ROUND(Ref1+(Ref2-Ref1)(y+1)/(x+y+2))$ (Equation 7)

for the other cases (more specifically, y=1, 3)

$Ref1=(p[x+(y>>1),-1]+2p[x+(y>>1))+1,-1]+p[x+(y>>1)+2,-1]+2)>>2$ $Ref2=(p[-1,3]+p[-2,3]+p[-3,3]+p[-4,3]+2)>>2$ $pred4\times 4[x,y]=ROUND(Ref1+(Ref2-Ref1)(y+1)/(x+y+2))$ a case where although an adjacent block located on the upper side can be used, an adjacent block located on the left side cannot be used:
when y=0, 2

$Ref1=(p[x+(y>>1),-1]+p[x+(y>>1)+1,-1]+1)>>1$ $Ref2=2p[x,-1]-p[x,-4]$ $pred4\times 4[x,y]=ROUND(Ref1+(Ref2-Ref1)(y+1)/(x+y+2))$ for the other cases (more specifically, y=1, 3)

$Ref1=(p[x+(y>>1),-1]+2p[x+(y>>1)+1,-1]+p[x+(y>>1)+2,-1]+2)>>2$ $Ref2=2p[x,-1]-p[x,-4]$ $pred4\times 4[x,y]=ROUND(Ref1+(Ref2-Ref1)(y+1)/(x+y+2))$ When prediction is to be executed in a prediction direction 8 (Horizontal Up) (1610), the prediction is performed by an equation 8 as follows:
when zHU=x+2*y,
a case where adjacent blocks located on the left and the upper side can be used:
when zHU=0, 2, 4

$Ref1=(p[-1,y+(x>>1)]+p[-1,y+(x>>1)+1]+1)>>1$ $Ref2=(p[3,-1]+p[3,-2]+p[-1,3]+p[-2,3]+2)>>2$ $pred4\times 4[x,y]=ROUND(Ref1+(Ref2-Ref1)(x+1)/4)$ Equation (8)

when zHU=1, 3

$Ref1=(p[-1,y+(x>>1)]+2p[-1,y+(x>>1)+1]+p[-1,y+(x>>1)+2-]+2)>>2$ $Ref2=(p[3,-1]+p[3,-2]+p[-1,3]+p[-2,3]+2)>>2$ $pred4\times 4[x,y]=ROUND(Ref1+(Ref2-Ref1)(x+1)/4)$ when zHU=5

$Ref1=(p[-1,2]+3p[-1,3]+2)>>2$ $Ref2=(p[3,-1]+p[3,-2]+p[-1,3]+p[-2,3]+2)>>2$ $pred4\times 4[x,y]=ROUND(Ref1+(Ref2-Ref1)(x+1)/4)$ for the other cases (more specifically, zHU>5)

$Ref1=p[-1,3]$ $Ref2=(p[3,-1]+p[3,-2]+p[-1,3]+p[-2,3]+2)>>2$ $pred4\times 4[x,y]=ROUND(Ref1+(Ref2-Ref1)(x+1)/4)$ a case where although an adjacent block located on the left side can be used, an adjacent block located on the upper side cannot be used:

a case where zHU=0, 2, 4

Ref1=(p[-1,y+(x>>1)]+p[-1,y+(x>>1)+1]+1)>>1

Ref2=2p[-1,y]-p[-4,y]

pred4.times.4[x,y]=ROUND(Ref1+(Ref2-Ref1)(x+1)/4)

when zHU=1, 3

Ref1=(p[-1,y+(x>>1)]+2p[-1,y+(x>>1)+1]+p[-1,y+(x>>1)+2- ]+2)>>2

Ref2=2p[-1,y]-p[-4,y]

pred4.times.4[x,y]=ROUND(Ref1+(Ref2-Ref1)(x+1)/4)

when zHU=5

Ref1=(p[-1,2]+3p[-1,3]+2)>>2

Ref2=2p[-1,y]-p[-4,y]

pred4.times.4[x,y]=ROUND(Ref1+(Ref2-Ref1)(x+1)/4)

for the other cases (more specifically, zHU>5)

Ref1=p[-1,3]

Ref2=2p[-1,y]-p[-4,y]

pred4.times.4[x,y]=ROUND(Ref1+(Ref2-Ref1)(x+1)/4)

In the embodiment described above, when two reference pixels are used, prediction of pixels which cannot be selected from encoded (decoded) pixels (for example, prediction of boundary pixels E, F, G, H in the step 1 shown in FIG. 4) is mainly performed by an average value of pixels belonging to the same row (or the same column) of encoded adjacent blocks. However, the above-described prediction does not need always the average value. For example, a minimum value, a maximum value, and a median value may also be used. In addition, any kind of calculating formula (for example, extrapolative prediction (or interpolative prediction) using these pixels) may also be used. In particular, when the interpolative prediction is performed, any kind of method (for example, linear interpolation, and nonlinear interpolation) may also be used. On the other hand, when the extrapolative prediction is performed, any kind of model (for example, straight line/parabola approximation using the least-squares method, the Newton's interpolation, and the Lagrange interpolation) may also be used to perform the prediction.

FIG. 17 is a conceptual diagram illustrating a case where the boundary pixels E, F, G, H are predicted by the extrapolative prediction in the step 1 (402) shown in FIG. 4. Here, a horizontal axis indicates coordinates, whereas a vertical axis indicates a luminance value. Reference numeral 1701 shows a case where the straight-line approximation is performed. A predicted straight row is calculated based on, for example, the least-squares method by using decoded pixels A', B', C', D' located in the lowermost line of an adjacent block located on the left side. Points corresponding to coordinates of boundary pixels E, F, G, H in the straight line are used as predicted values. In addition, reference numeral 1702 shows a case where the same extrapolative prediction is performed by curve approximation including the parabola approximation, the Newton's interpolation, and the Lagrange interpolation. In this case, boundary pixels E, F, G, H are predicted on the basis of a predicted curve calculated by use of decoded pixels A', B', C', D'. The boundary pixels predicted by the above processing are used as one of reference pixels, for example, when bidirectional prediction in the step 2 shown in FIG. 4 is performed.

In addition, information used for the prediction of reference pixels is not particularly limited to pixels belonging to the same row (or column) so long as it is information about adjacent blocks. Moreover, according to this embodiment, the bidirectional prediction (for example, prediction of pixels J, K, L in the step 2 shown in FIG. 4) is performed by the linear interpolation that uses two reference pixels. However, the interpolation method thereof is not particularly limited so long as a target pixel is located between the two reference pixels to be used. For example, a predicted value of the target pixel may also be expressed by any straight-line equation of two reference pixels. In this case, on the assumption that two reference pixels are defined as Ref1, Ref2, a predicted value pred4.times.4 is calculated by an equation 9 as follows:

$$\text{pred4.times.4}[x,y]=a\text{Ref1}+b+\text{Ref2} \quad \text{(Equation 9)}$$

Here, each of a, b represents a constant that is a real number. These values may also be defined as predetermined values, or may also be specified on a block basis. In addition, blocks to which the intra prediction encoding method (decoding method) used for the screen end shown in FIG. 5 (FIG. 8) can be applied are not particularly limited to blocks located at the screen end. In other words, this method may also be applied to blocks other than the blocks located at the screen end.

Figure 18:
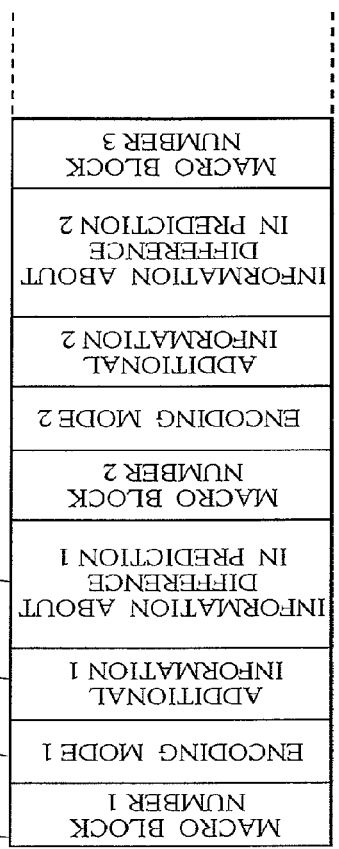
FIG. 18 is a diagram illustrating a configuration example of an encoded stream according to one embodiment of the present invention.

FIG. 18 is a diagram illustrating a configuration example of an encoded stream generated according to this embodiment, the diagram mainly showing encoding parameters that should be set on a block basis. Here, as is the case with the unit of processing based on the H.264/AVC, an encoding mode is determined on a fixed-length macro block basis. Each macro block can be further divided into smaller blocks. Prediction encoding shall be performed on a divided block basis. In this case, information is encoded in variable-length, and is then stored. The information to be subjected to encoding includes: a macro block number (1801) used to identify coordinates on a macro block basis; an encoding mode number (1802) that indicates a prediction method and the block size; information required for prediction (1803) including, for example, a motion vector at the time of inter prediction, and a prediction direction at the time of intra prediction; and information about difference in prediction (1804). In particular, the encoding mode number (1802) may also be serially assigned to all prediction means, or may also be expressed with different bits on a prediction means basis.

Figure 19:
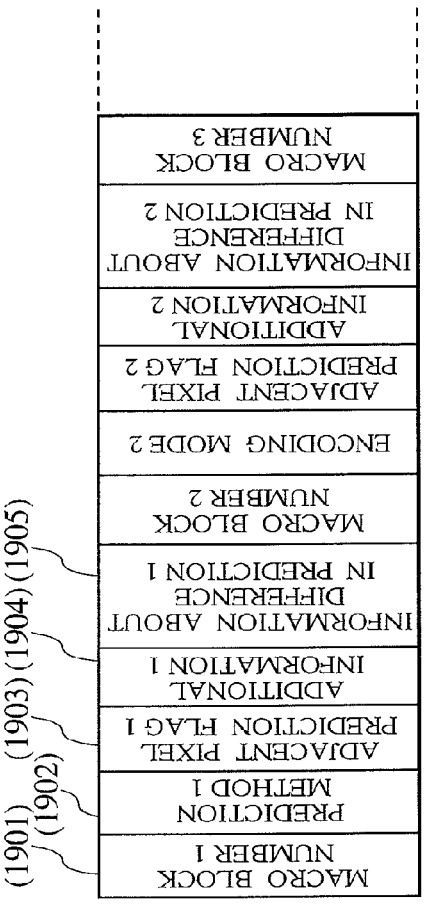
FIG. 19 is a diagram illustrating a configuration example of an encoded stream according to one embodiment of the present invention.

FIG. 19 is a diagram illustrating another configuration example of an encoded stream generated according to this embodiment shown in FIG. 18, the diagram mainly showing encoding parameters that should be set on a block basis. This configuration example includes: a macro block number (1901); a prediction method (1902); a flag (1903) indicating whether or not to perform prediction using an adjacent pixel according to this embodiment; informational required for prediction (1904); and information about difference in prediction (1905).

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications as fall within the ambit of the appended claims.

What is claimed is:

1. An image decoding method that decodes an image by performing prediction processing, comprising:
   a prediction mode selection step, which selects one of a plurality of prediction modes for the prediction processing; and
   a prediction step, which performs the prediction processing of the prediction mode selected at the prediction mode selection step, wherein the prediction modes selectable at the prediction mode selection step include:
   a first intra prediction mode in which first reference pixels are generated employing pixels within a decoded block adjacent to one of left and upper sides of a target block to be decoded, and prediction pixels are generated through computation employing values of decoded second reference pixels adjacent to one of the upper and left sides of the target block to be decoded which is a different side from the first reference pixels and values of the first reference pixels; and
   a second intra prediction mode which is different from the first intra prediction mode and in which prediction pixels are generated employing values of the decoded pixels adjacent to the target block to be decoded,
   wherein there is a state in the first intra prediction mode in which calculation processing of values of the prediction pixels employing the computation is feasible for any pixels excepting all boundary pixels located at a right end of the target block to be decoded within the target block to be decoded,
   wherein the prediction pixels are generated through computation employing interpolation processing between the values of the second reference pixels and the values of the first reference pixels in the first intra prediction mode, and
   wherein a processing order of the target block to be decoded does not change irrespectively of whether the first intra prediction mode or the second intra prediction mode is selected at the prediction mode selection step.

* * * * *